United States Patent [19]

Lieber

[11] Patent Number: 5,384,870
[45] Date of Patent: Jan. 24, 1995

[54] METHOD AND APPARATUS FOR IDENTIFYING THE POSITION OF TWO GROUPS OF LIGHT WAVEGUIDES TO BE ALIGNED

[75] Inventor: Winfried Lieber, Offenburg, Germany

[73] Assignee: Siemens Aktiengesellschaft, Munich, Germany

[21] Appl. No.: 100,244

[22] Filed: Aug. 2, 1993

[30] Foreign Application Priority Data

Aug. 7, 1992 [DE] Germany .............................. 4226201

[51] Int. Cl.⁶ .............................................. G02B 6/26
[52] U.S. Cl. ........................................ 385/15; 385/50;
385/71; 385/59; 385/27
[58] Field of Search .................. 385/15, 95, 96, 97,
385/98, 106, 112, 114, 120, 24, 46, 50, 54, 59,
71, 17, 27; 356/73.01

[56] References Cited

U.S. PATENT DOCUMENTS

| | | | |
|---|---|---|---|
| 4,978,201 | 12/1990 | Yamada et al. | 385/96 |
| 5,011,259 | 4/1991 | Lieber et al. | 350/96.21 |
| 5,170,456 | 12/1992 | Itoh et al. | 385/96 |

FOREIGN PATENT DOCUMENTS 0303990  9/1990  European Pat. Off. .
WO93/16363  9/1993  WIPO .

*Primary Examiner*—John D. Lee
*Assistant Examiner*—Phan Thi Heartney
*Attorney, Agent, or Firm*—Hill, Steadman & Simpson

[57] ABSTRACT

For identifying the local distribution of light waveguides in two groups to be aligned to one another, the groups are displaced at least once relative to one another transversely relative to the longitudinal axes of the light waveguides to be investigated in at least one plane. The chronological curve of the intensity distribution of the light coupled from the one group into the other group during the displacement is identified and evaluated. For optimally aligning the waveguides with two groups, an intensity distribution for each group is obtained and the distributions are compared to find an alignment which produces a maximum overlap. A splicing operation may be then conducted with the groups thus aligned, and the same technique can then be used to control the splicing as well as to check the quality of the splice.

30 Claims, 5 Drawing Sheets

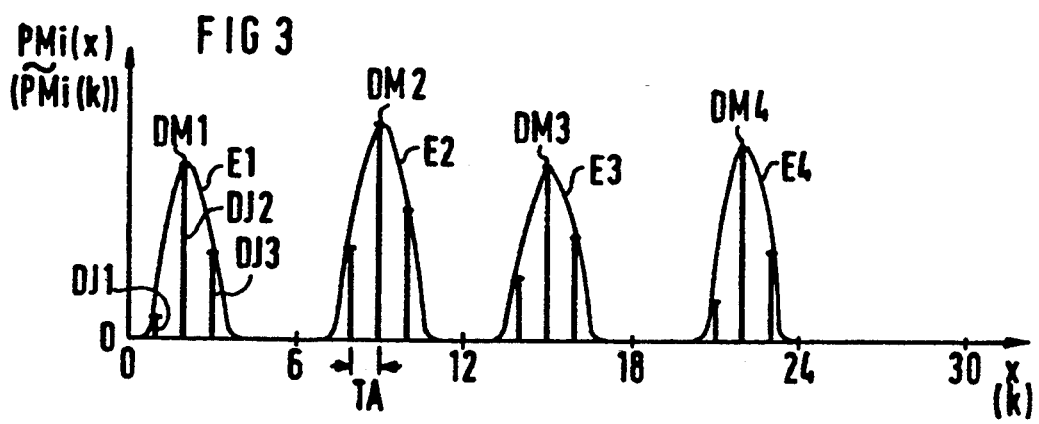
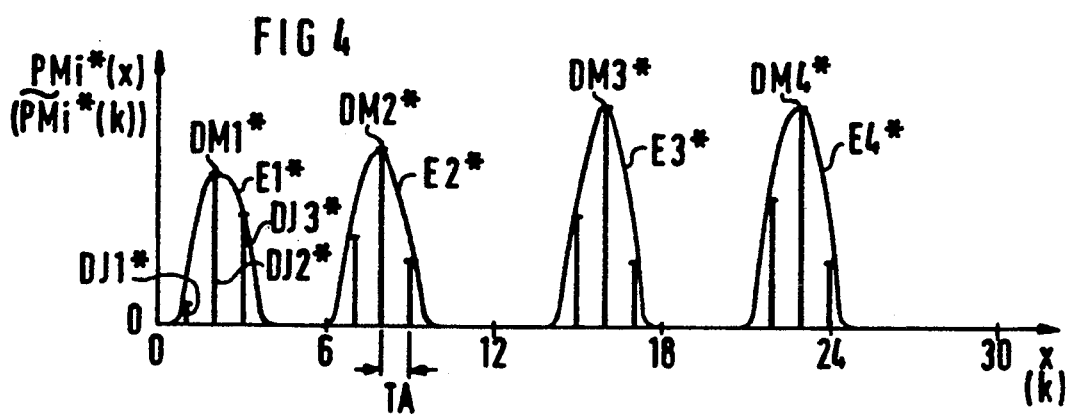
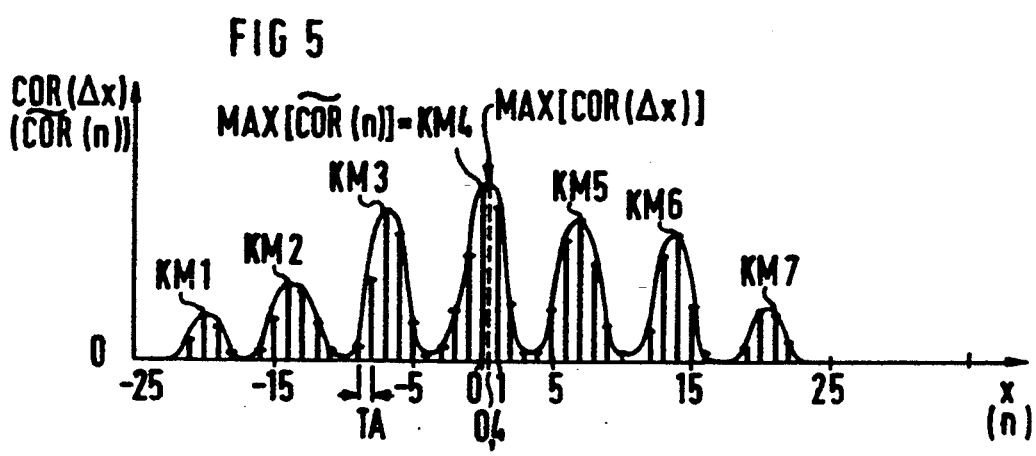

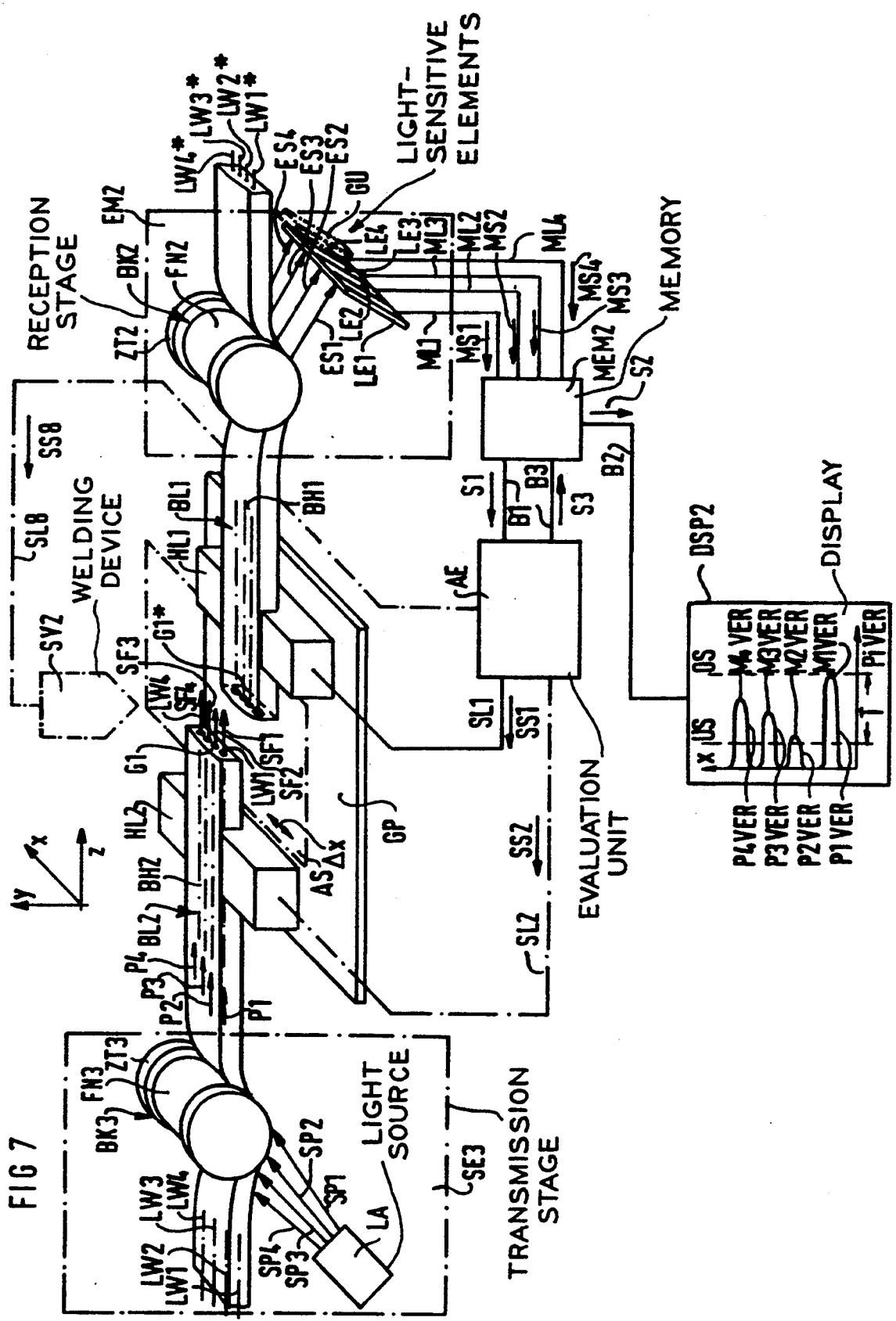

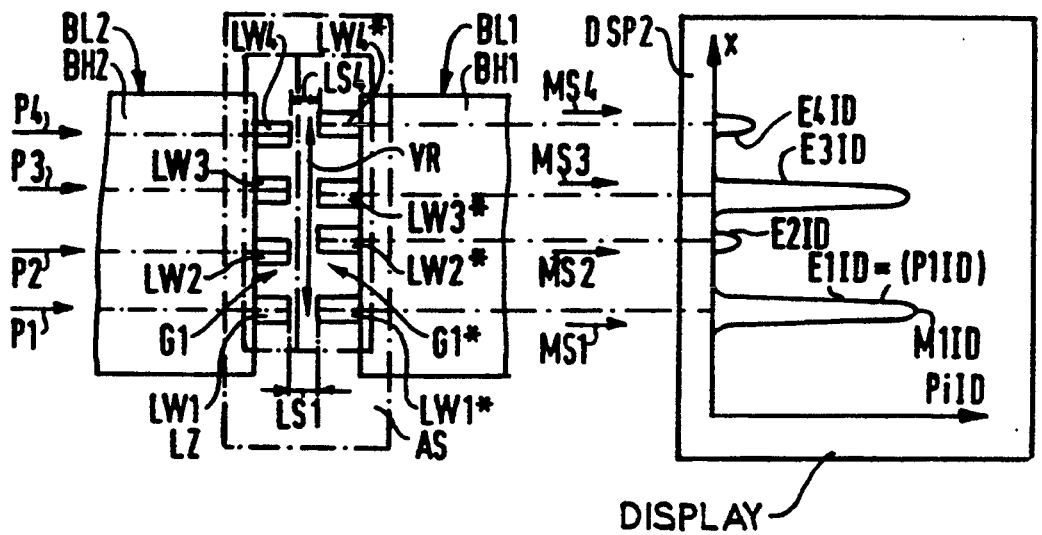
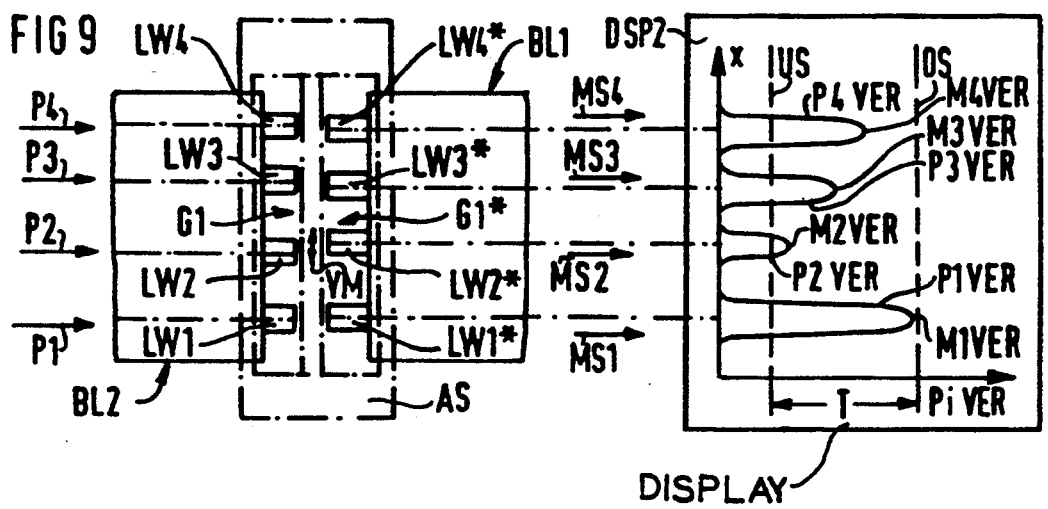
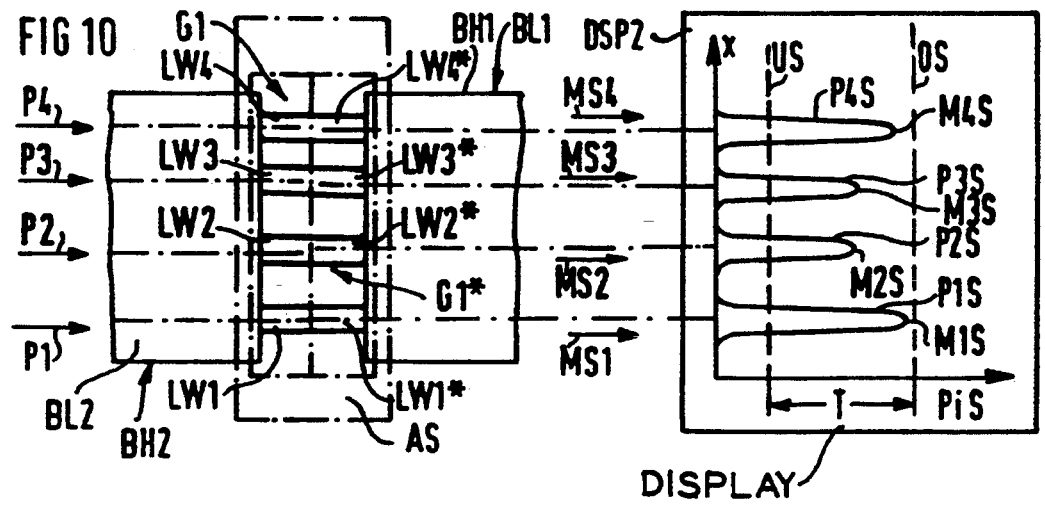

METHOD AND APPARATUS FOR IDENTIFYING THE POSITION OF TWO GROUPS OF LIGHT WAVEGUIDES TO BE ALIGNED

BACKGROUND OF THE INVENTION

1. Field of the Invention

The present invention is directed to a method and apparatus for identifying the position of light waveguides in two groups to be aligned with one another, whereby light is coupled into at least one light waveguide of one group.

2. Description of the Prior Art

German OS 39 00 406 discloses a method for aligning two sets of optical fibers. For checking the alignment conditions of optical fibers in a pair of ribbon fiber cables, a reflective mirror is arranged adjacent to the optical fibers of the pair of ribbon conductors. A illuminating light is supplied into the optical fibers in one plane that differs from the normal direction of a plane formed by the optical fibers. First, an image is observed that arises due to the illuminating light that is reflected by the mirror and is then conducted through the optical fibers. Also, an image is observed that is formed by the illuminating light that is guided through the optical fibers and is then reflected by the mirror.

It is presumed in this known method that the optical fibers are respectively individually stripped at the ribbon conductors lying opposite one another. The material that surrounds the optical fibers and holds them together is thus removed and the optical fibers are freely mobile as a result. This is necessary for an observation of the alignment conditions of the optical fibers in order to be able to laterally illuminate them from the outside and in order to be able to optically image their contours individually and separately from one another. The known measuring procedure thus only allows statements and conclusions about the local distribution of the exposed optical fibers in an indirect way. By contrast, the actual, local intensity distribution of the light that is respectively guided in the core of the light waveguides can only be made mensurationally accessible with high outlay. Statements about the real light intensity conditions in the two ribbon conductors can essentially be made only in restricted fashion with this known method. As a result, the alignment of the ribbon conductors to one another, for example for splicing purposes, is relatively imprecise.

SUMMARY OF THE INVENTION

It is an object of the present invention to provide a method and apparatus wherein the local intensity distribution, and thus the local position, of the light waveguides in two groups to be aligned to one another can be more simply and reliably identified.

In the method of the invention, this object is achieved by displacing a first of the two groups at least once relative to the other, second group, the displacement generated transversely to the longitudinal axis of the light waveguides in at least one place. Light is continuously coupled into at least one light waveguide one of the groups from at least one light waveguide of the other group during the displacement. The chronological curve of the intensity distribution of the coupled light is identified in one of the groups, and the topical intensity distribution of the light waveguides in the other group, resulting from the chronological distribution is retained for evaluation purposes and an optimum alignment of the two groups is made based on the evaluation.

The invention is particularly advantageous because the respective topical intensity distributions of the light waveguides in the two groups can be individually identified, i.e. selectively for every light waveguide, in a direct way due to a simple motion of the two groups of light waveguides relative to one another. From the group-by-group topical intensity distributions of the light waveguides, their actual, topical position, i.e. their position relative to one another, can be individually identified with high topical resolution. The simple displacement motion can be implemented without great outlay. Moreover, holding devices or adjustment elements for displacing the light waveguides are already present in most measuring equipment for light waveguides such as, for example, in splicing devices or measuring instruments for transmission losses. An additional, mechanical outlay for the implementation of the method of the invention is thus not required in this case. At the same time, the simple displacement motion of the two groups relative to one another offers the advantage that an image of the relative position of the two groups of light waveguides relative to one another can be identified relatively quickly.

In a first embodiment of the invention, the light waveguides of a group can be respectively mechanically connected to one another, preferably in an outer envelope of a ribbon conductor. The relative local distribution or position of the light waveguides in such a mechanically fixed union can be reliably identified without pulling or exposing (stripping) the light waveguides. The reason for this is that parts of the light power respectively guided in the light waveguides can be individually measured in a direct way. A quantity can thus be measured that is proportional to the guided light power. Knowledge of the respectively actually guided light power (in mW) is not necessary for the measurement and evaluation.

According to a second embodiment of the invention, the local intensity distribution of the light waveguides in the first group is acquired in a first measuring procedure and the local intensity distribution of the light waveguides in the second group is subsequently acquired in a second measuring procedure. To this end, light from the light waveguides of the first group to be topically measured is first coupled into at least one observation, or test, light waveguide of the second group and light from at least one light waveguide of the second group is then coupled into at least one observation, or test, light waveguide of the first group. The observation light waveguide for one of the first or second group is the moved past the light waveguides to be measured, this movement taking place transversely relative to the longitudinal axis of the light waveguides to be measured in at least one plane. The observation light waveguide, for example, can be a selected light waveguide of the group that resides opposite ,the other group, and is not being investigated at the moment, or can be a test light waveguide which is separately provided. The two overall intensity distributions of the light waveguides of the two groups that are registered can be correlated to one another, so that the location of maximum coincidence, "relationship," between the two groups can be identified. This location of optimum alignment, i.e. the optimum alignment condition between the two groups can then be approached, particularly for fusing two ribbon conductors wherein no individual alignment of corresponding light waveguide pairs is possible.

In a third embodiment of the invention, the light waveguides of the first group are displaced at least once relative to one another transversely relative to the longitudinal axis of the light waveguides of the second group in at least one plane. The relative position of the light waveguides of the first group relative to the light waveguides of the second group can be directly acquired from the chronological curve of the intensity distribution of the over-coupled light from the light waveguides of the second group to the light waveguides of the first group (or vice versa).

Preferably, the displacement motion of the first group relative to the second group is started proceeding from a position wherein a maximum for the individual intensity distribution, individual power level or coupling efficiency of the corresponding light waveguide pair can still be respectively exceeded for every corresponding light waveguide pair. To that end, for example, the first group is shifted to such an extent in comparison to the second group that the groups no longer reside opposite one another. It can also be advantageous merely to move the first group back and forth somewhat relative to the second group, i.e. to implement a type of jitter motion. The jitter motion has the advantage that only relatively small displacement motions of the two groups relative to one another are required with high speed making for a measurement. In particular, the first group is moved back and forth in the jitter motion relative to the second group by approximately the greatest, remaining offset of the most poorly aligned light waveguide pair. This procedure enables an extremely fast and precise position identification of the two groups of light waveguides relative to one another in a simple way.

Preferably, that overall intensity distribution or overall power distribution or overall coupling efficiency, for which all corresponding light waveguide pairs simultaneously exhibit their greatest, individual intensity distributions or power levels in common in the chronological curve of the measured overall intensity distribution, is registered during the displacement motion or jitter motion. The associated displacement location then defines the optimum alignment condition, i.e. the location of maximum "relationship" between the two groups to be aligned to one another.

In a fourth embodiment of the invention, a splice connection between the two groups of light waveguides to be connected to one another can be implemented for the optimum alignment condition acquired with the assistance of the displacement motion or jitter motion. This can be used for multi-fiber connections such as, for example, two ribbon conductors to be fused to one another, assuming an individual, aligning, i.e. ideal alignment of the cores of the two corresponding light waveguides of the first and second group, is not possible in the case of two respectively mechanically fixed groups of light waveguides. In the optimum alignment condition, i.e. at the location of maximum relationship, a splice connection, particularly a fusing of corresponding light waveguide pairs, or light waveguide combinations, can be implemented in a multiple splicing device. This enables adequately good spliced connections between two corresponding light waveguides of the first and second group, given simultaneous reduction of the costs and production time per individual spliced connection.

The invention also encompasses a method for splicing first and second groups of light waveguides, wherein light is coupled into at least one of the light waveguides of a group, the splicing of the light waveguides of the first group to the light waveguides of the second group being controlled with the chronological intensity distribution of the light that is coupled over during the splicing from at least one light waveguide of the second group into at least one light waveguide of the first group.

One can proceed in an especially expedient way for controlling the splicing procedure, particularly when fusing, as follows. The light waveguide pair that has the greatest radial offset in the optimum viewing alignment position is identified in a simple way from the curve of the local, overall intensity distribution of the light guided in the observation light waveguide, or in the light waveguides of the second group. This light waveguide combination unambiguously has the lowest, relative power level in the overall intensity distribution or in the overall power level. The "lowest relative power level" means the lowest absolute power level referred to the maximum absolute power measured in the aligned condition. It is difficult to absolutely measure the lowest power level (and, moreover, is not required for the evaluation) since the received level is dependent, among other things, on the infeed and outfeed efficiencies of the transmitter and receiver (for example, due to different color coats on the light waveguides to be measured). The individual intensity distribution or power level belonging thereto can be expediently employed for controlling the splicing procedure, in particular the fusing procedure for all other, corresponding light waveguide combinations of the first and second group. In this way, the most poorly aligned light waveguide pair can still be spliced with an adequate quality and the same (or better) can thus also be simultaneously assured for all other, corresponding light waveguide pairs. These advantages can also be achieved when the two groups to be aligned to one another, and to be connected to one another, reside opposite one another in any alignment position that is acquired with methods and procedures other than the relative motion presented in the invention as well as on the basis of the light over-coupling between the two groups that thereby occurs. For example, a suitable aligned condition of the two groups can also be identified with the assistance of a video camera.

The invention also encompasses a method for identifying the attenuation of two groups of light waveguides to be spliced to one another, wherein light is coupled into at least one of the light waveguides of one group. In this method two light waveguides of the respective groups allocated to one another are aligned to one another in chronological succession in a first measuring step during the displacement motion. Their respective intensity distribution is identified in this ideal alignment condition and is retained. In a second measuring step, an optimum alignment condition is identified during the displacement process for the first and for the second groups of light waveguides and these groups are displaced to that location. Their intensity distribution is measured in this optimum alignment condition for two corresponding light waveguides in the respective groups and is retained. In a third measuring step, the two groups are brought into the identified, optimum alignment condition and their corresponding light waveguides are spliced to one another. Finally, the intensity distribution is identified and retained after the splicing procedure for two light waveguides in the respective groups which are connected to one another. The splice attenuation for the two light waveguides connected to one another is selectively identified from the intensity distributions thus obtained in three measuring steps.

In general, the following three independent measuring steps are implemented for the optimally exact identification of optical transmission characteristics after the connecting of the two groups of light waveguides, particularly the splice attenuation when fusing the light waveguides of two ribbon conductors. In a first measuring step, the two groups (such as the two ribbon conductors) that are still unconnected and unaligned are shifted relative to one another (for example, by a jitter motion) such that an individual, ideal alignment respectively arises for every corresponding light waveguide pair (in chronological succession for a plurality of light waveguides to be aligned or simultaneously for all light waveguides to be aligned). The power level at the location of ideal alignment is individually registered for every light waveguide combination.

In a second measuring step, the two ribbon conductors (groups) are displaced into an optimum alignment condition that can be identified from the chronological curve of the overall intensity distribution during the displacement motion (or jitter motion) of the two groups relative to one another. In the optimum alignment condition, the power levels for the corresponding light waveguide combinations are selectively retained.

In the third measuring step, the corresponding light waveguide pairs are spliced (fused) to one another in the optimum alignment condition and the power level for each light waveguide combination is identified and retained.

Taking the air gap transmission characteristics between two corresponding light waveguides into consideration if necessary, the actual, individual optical transmission characteristics, particularly the splice attenuation for each connected light waveguide pair can be selectively calculated with high precision based on these three power levels.

The implementation of the three measuring steps is not limited to the method of the invention described above for identifying the position of light waveguides, but also can be advantageously carried out in combination with other methods and apparatus for identifying the position of light waveguides (for example, in video pick-up methods).

The invention is also directed to an apparatus for the implementation of the method. This apparatus includes a first holder device having a first group of light waveguides, which is displaceably arranged relative to a second holder device having a second group of light waveguides. The displacement of the holder devices takes place in at least one plane extending transversely relative to the longitudinal axis of the light waveguides. Reception means are provided for receiving the chronological curve of the intensity distribution of the light coupled from at least one light waveguide of the second group into at least one light waveguide of the first group. A memory is provided that identifies the topical intensity distribution of the light waveguides from the chronological intensity distribution and retains this for evaluation purposes.

DESCRIPTION OF THE DRAWINGS

FIGS. 3 and 4 respectively show two overall intensity distributions from the method of the invention according to FIG. 1.

FIG. 5 shows a cross-correlation function relating the two overall intensity distributions of FIGS. 3 and 4.

FIG. 7 is a schematic illustration of a further embodiment of an apparatus constructed in accordance with the principles of the present invention for implementing the method of the invention.

FIGS. 8 through 10 schematically show a sequence in the implementation of the method of the invention according to FIG. 7 for identifying optical transmission quantities, particularly the splice attenuation.

DESCRIPTION OF THE PREFERRED EMBODIMENTS

Figure 1:
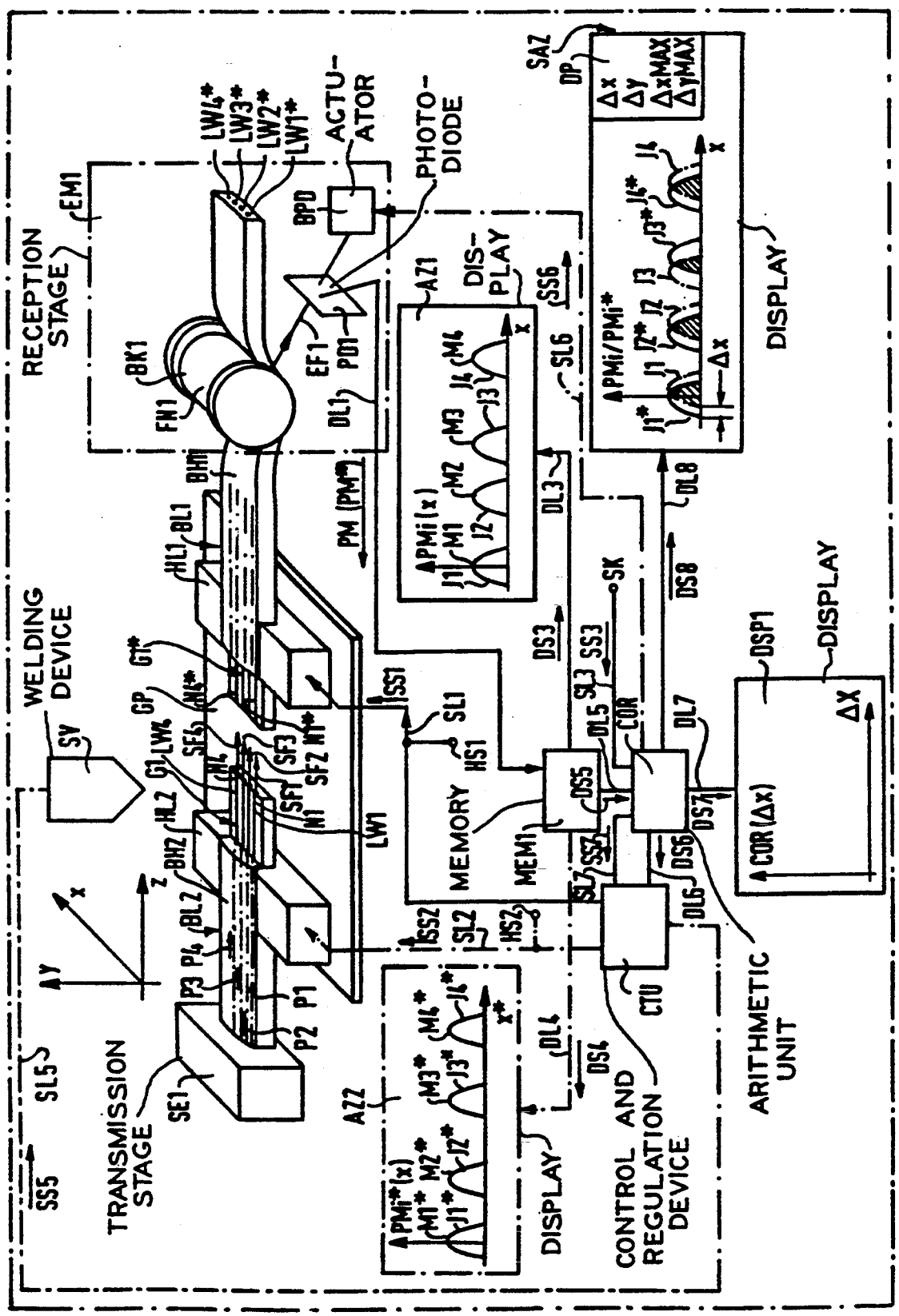
FIG. 1 is a schematic illustration showing the basic structure of an apparatus constructed in accordance with the principles of the present invention for implementing the method of the invention.

A first group G1* having, for example, four light waveguides LW1* through LW4* is shown in the right part of FIG. 1 and a second group G1 likewise having, for example, four light waveguides LW1 through LW4 is shown in the left part. These two groups G1* and G1 are to be aligned to one another or possibly connected to one another, such as by being welded (fused) to one another. The light waveguides LW1* through LW4* and/or LW1 through LW4 can, for example, be optical fibers which are loosely arranged in unstructured fashion in the group G1* or G1, but can also be mechanically connected to one another in the form of a ribbon conductor having an envelope that firmly surrounds the waveguides. In FIG. 1, the light waveguides LW1* through LW4* are mechanically fixed in an approximately rectangular ribbon conductor BL1, roughly parallel side-by-side. The light waveguides LW1* through LW4* embedded in an outer sheath BH1 are indicated with dot-dash lines. The light waveguides LW1 through LW4 of the group G1 are likewise mechanically fixed in an approximately rectangular ribbon conductor BL2 roughly parallel side-by-side. Their outer sheath BH2 is shown in the left part of FIG. 1.

In order to be able to assure defined initial conditions from the alignment of the ribbon conductors BL1 and BL2 relative to one another, the ribbon conductor BL1 is held in a holding mechanism HL1 and the ribbon conductor BL2 is held in a holding mechanism HL2. The holding mechanisms HL1 and HL2 are arranged on a common base plate GP. The two ribbon conductors BL1 and BL2 to be aligned to one another are respectively stripped of their outer envelope BH1 or BH2 in the region of their ends residing opposite one another for the purpose of a subsequent splicing procedure (for example, welding procedure). In this case, it can be expedient for securing the position of the exposed light waveguides to place the freely mobile ends of the light waveguides LW1* through LW4* into longitudinally extending, V-shaped guide channels N1* through N4* of a guide means, for example a roughly rectangular plate. Likewise, the disengaged light waveguides LW1 through LW4 are introduced into roughly V-shaped guide channels N1 through N4 that extend approximately parallel to the longitudinal axis of the light waveguides in a guide means that is also fashioned as a roughly rectangular plate. The guide channels N1* through N4* or N1 through N4 preferably have a cross-sectional width that approximately corresponds to the width of the respective groups of light waveguides LW1* through LW4* and LW1 through LW4. The guide channels N1* through N4* and N1 through N4 of the two guide means are preferably equidistantly spaced in order to be able to bring the light waveguides LW1* through LW4* and LW1 through LW4, disposed approximately parallel side-by-side, into a defined, positionally secured initial condition. The guide means are preferably attached to the same side of the holding devices HL1 and HL2 as the two groups G1* and G1 to be aligned relative to one another.

In order to be able to optimally align the two groups G1* and G1 relative to one another, the local intensity distribution of each group of light waveguides LW1* through LW4* and LW1 through LW4, G1 is respectively identified with optimally high topical resolution. The position of greatest possible coincidence, i.e. the location of maximum "relationship" between the two groups G1* and G1, can be identified from these intensity distributions. The respective, local position identification of the light waveguides within each group is accomplished on the basis of the following two measurement steps, that are implemented independently of one another. The sequence of the two measuring steps is of no significance.

In a first measuring step, the local intensity distribution of the light waveguides LW1 through LW4 in the group G1 is identified and investigated. For this purpose, a transmission stage SE1 is coupled to all light waveguides LW1 through LW4 of the ribbon conductor BL2. The transmission stage SE1 is schematically shown in the left part of FIG. 1. This transmission stage SE1 is fashioned such that optical test signals P1 through P4 can be respectively coupled into the light waveguides LW1 through LW4 in the direction toward the alignment location, such as by using a flexural coupler within SE1, of the type as shown within the reception stage EM1 at the right side of FIG. 1, and referenced BK1. The test signals P2 through P4 are symbolically indicated by respective arrows in FIG. 1. In the discussion of FIG. 1 it is assumed that the test signals P2 through P4 are identical, i.e. of the same size.

The optical test signals P2 through P4 run through the four light waveguides LW1 through LW4 to the alignment location. The associated radiation fields SF1 through SF4 individually emerge from the open ends of the light waveguides LW1 through LW4. The topical, overall intensity distributions of the light waveguides LW1 through LW4 can now be measured by moving at least one observation light waveguide past light waveguides LW1 through LW4 extending transversely relative to the longitudinal axis of the light waveguides LW1 through LW4 in at least one plane. The light waveguide LW1* of the ribbon conductor BL1 to be spliced to the ribbon conductor BL2 is selected as the observation light waveguide in FIG. 1. One thereby eliminates the additional insertion of a separately provided observation light waveguide, so that substantially constant, time-invariable measuring conditions can be assured. Of course, it is also possible to provide a separate measurement light waveguide or a measurement ribbon conductor for the measuring process.

During the relative motion of the observation light waveguide LW1*, the radiation fields SF1 through SF4 are successively coupled into the observation light waveguide LW1* in chronological succession. The intensity distributions of the light waveguides LW1 through LW4 are thereby registered and are made accessible to for evaluation. The observation light waveguide LW1* thus acts as a pick-up camera that is moved past and along the test subjects to be examined. The motion of the measurement light waveguide LW1* relative to the light waveguides LW1 through LW4 of the group G1 can ensue in several ways. For example, the group G1 can be stationarily arranged in the holding device HL2, whereas the observation light waveguide LW1* is moved past the group G1 with the holding device HL1. Conversely, the observation light waveguide LW1* can also be stationarily arranged, with the group G1 having the light waveguides LW1 through LW4 being displaced in the holding device HL2. It is likewise possible to simultaneously shift the group G1 with the holding device HL2 and the observation light waveguide LW1* with the holding device HL1 relative to one another. The displacement event preferably ensues with a constant relative speed, so that the chronological curve of the intensity distribution of the light fed into the observation light waveguide LW1* directly corresponds to the local intensity distribution of the light waveguides LW1 through LW4 in the group G1. Preferably, the displacement motion of the observation light waveguide LW1* is implemented at least once in a first direction x parallel to the plane containing the axes of the light waveguides LW1 through LW4. Subsequently, a second displacement motion in the direction of y perpendicular to the first observation direction x can be undertaken at least once.

The chronological curve of the intensity distribution of the infed light of the radiation fields SF1 through SF4 fed (coupled) into the observation light waveguide LW1* can be registered with a reception stage EM1, shown bounded with dot-dash lines in the right part of FIG. 1. The reception stage EM1 has a flexural coupler BK1 having a guide channel FN1 sufficiently broad so that the ribbon conductor BL1 is held secured against displacement in the flexural coupler BK1. The chronological curve of the intensity distribution in the measurement light waveguide LW1* can, for example, be measured with the assistance of a photodiode PD1. To this end, the photodiode PD1 is arranged and aligned in the reception region of the flexural coupler BK1 such that its reception region substantially covers the reception radiation field EF1 that emerges along the curvature of the light waveguide LW1*. The photo diode PD1 converts the light energy of the outfed reception radiation field EF1, i.e. the chronological curve of the intensity distribution guided in the light waveguide LW1*, into an electrical measured signal PM. This measured signal PM is supplied via a line DL1 to a measured value memory MEM1 and is stored therein.

In the second measuring step, the topical intensity distribution of the light waveguides LW1* through LW4* of the group G1* in the ribbon conductor BL1 is acquired analogously to the procedure of the first measuring step. To that end, the transmission stage SE1 is coupled to all light waveguides LW1* through LW4* of the ribbon conductor BL1 in the right part of FIG. 1, with the preferably identical test signals P1* through P4* being individually supplied in the direction toward the alignment location into the four light waveguides LW1* through LW4* to be measured. The receiver stage EM1 is now coupled to the ribbon conductor BL2 in the left part of FIG. 1. The second measurement procedure is thus implemented mirror-inverted with respect to the transmission stage SE1 and the reception stage EM1 compared to the arrangement shown in FIG. 1, i.e., the transmission and reception side are interchanged. A light waveguide of the group G1, for example, the light waveguide LW1, is utilized as the observation light waveguide. Analogously to the first measuring step, a displacement event (scanning) transversely relative to the longitudinal axis of the ribbon conductor BL1, i.e., in the x-direction and/or the y-direction, is implemented at least once for registering the local intensity distribution of the light waveguides LW1* through LW4*. The chronological curve of the local intensity distribution of the radiation fields outfed from the light waveguides LW1* through LW4* into the observation light waveguide LW1 moving past them can, analogously to the first measuring step, then be registered with the photodiode PD1, that is now coupled to the ribbon conductor BL2. The photodiode PD1 is positioned in the reception region of the flexural coupler BK1 so that its reception region is aligned with the reception radiation field of the light waveguide LW1 and roughly completely covers this field. The light infed into the light waveguide LW1 is converted into an electrical measured signal PM* in the photodiode PD1 and is likewise stored in the measured value memory MEM1 via the line DL1.

For identifying an optimum alignment condition between the two groups G1* and G1, more than one displacement event can be implemented for each displacement direction. Thus, for example, the group G1* can be multiply passed relative to the observation light waveguide LW1 in the x-direction and/or in the y-direction, i.e. a displacement event can also be undertaken more than once in the same displacement direction. The intensity distributions found in this way can be averaged for the purpose of higher measuring precision and can be utilized for evaluation purposes only after this averaging. For this application, the measured value memory MEM1 is preferably fashioned such that it can store a plurality of intensity distributions PM and PM* of the groups G1 and G1*.

For evaluation purposes, the topical, overall intensity distributions for the light waveguides of the groups G1 and G1* are respectively visually presented for the two measuring steps. The local intensity distribution of the light waveguides LW1 through LW4 of the group G1 from the first measuring step is called from the measured value memory MEM1 for this purpose and is successively communicated to a display AZ1 (shown in the right part of FIG. 1) with a signal DS3 via a line DL3. For example, an overall intensity distribution or envelope $PMi(x)$ with i=1 through 4 is portrayed on the display AZ1 which can, for example, have been picked up during a displacement event (scan) along the x-axis. The "snapshot" in the display AZ1 shows four separate individual intensity distributions or envelopes J1 through J4 that are allocated to the four light waveguides LW1 through LW4. Their maxima M1 through M4 respectively identify the location of maximum light guidance in the light waveguides LW1 through LW4, i.e., they respectively identify the position of the cores of the light waveguides LW1 through LW4. The exact position of the cores of the light waveguides LW1 through LW4 within the ribbon conductor BL2 is thus identified by these maxima M1 through M4 and can be directly read. Given monomode light waveguides, the intensity distributions J1 through J4 will be significantly narrower and steeper (order of magnitude of 10 $\mu$m). The spacing between two individual intensity distributions amounts to approximately 260/$\mu$m. It may be seen from the illustration in the display AZ1 that the core of the light waveguide LW3 is shifted somewhat in the direction toward the light waveguide LW1, i.e. that there is not an equidistant core distribution within the ribbon conductor BL2.

Analogously to the display AZ1, the curve of the topical intensity distribution of the light waveguides LW1* through LW4* within the ribbon conductor BL1 is continuously visually displayed on a display AZ2 that is indicated with dot-dash lines in the left half of FIG. 1. To that end, the measured data for the local intensity distribution of the light waveguides LW1* through LW4* registered in the measured value memory MEM1 are respectively called from the measured value memory MEM1 and are successively forwarded to the display AZ2 as a signal DS4 via a line DL4. The display AZ2 of FIG. 1, for example, shows a local, overall intensity distribution or envelope $PMi^*(x)$ with i=1 through 4 for the light waveguides LW1.* through LW4*, given the assumption of a scan with the observation light waveguide LW1 along the x-direction. The "snapshot" in the display AZ2 shows four separate intensity distributions or envelopes J1* through J4* having four maxima M1* through M4* that are respectively allocated to the cores of the four light waveguides LW1* through LW4* of the group G1*. The maxima M1* through M4* identify the respective positions at which the maximum light energy is guided in the light waveguides LW1* through LW4*, i.e. they respectively represent the position of the light-guiding cores in the ribbon conductor BL1.

In order to be able to optimally align the two ribbon conductors BL1 and BL2 relative to one another, it can be sufficient for an operator to directly visually compare the topical intensity distribution $PMi(x)$ of the group G1 to the topical intensity distribution $PMi^*(x)$ of the group G1* and to estimate an optimum alignment position therefrom for the ribbon conductors BL1 and BL2 relative to one another. In order to bring the two ribbon conductors BL1 and BL2 into the optimum alignment position identified in this way, a manual actuator HS1 is provided for the operator, which causes a control signal SS1 for operating the holding device HL1 to be supplied via a control line SL1. It is also possible for the operator to displace the holding device HL2 with an actuator HS2, which causes a control signal SS2 to be supplied via a control line SL2, as shown with dot-dash lines.

The locating of and approach to an optimum alignment condition can be automated on the basis of an evaluation in an arithmetic unit COR. The operator can shift the two corresponding test exposures for the topical intensity distributions PMi and PMi* over one another with the assistance of a manual control SK and with the assistance of the arithmetic unit COR for the purpose of comparison, and thus can locate the maximum overlap of the individual intensities or envelopes J1 through J4 of the group G1 with the individual intensities or envelopes J1* through J4* of the group G1*. To that end, the operator triggers a control signal SS3 with the manual control SK. This control signal SS3 instructs the arithmetic unit COR via a control line SL3 to respectively read two corresponding, overall test exposures ("snapshots") of the topical intensity distributions PMi and PMi* with i=1 through 4 out of the measured value memory MEM1, as a signal DS5 via a line DL5, and to shift them in overlapping fashion. In order to be able to monitor and observe the manipulation or displacement event with the manual control SK, the arithmetic unit COR transmits the test exposures PMi and PMi* to a common display SAZ as a signal DS8 via a line DL8. This common display SAZ separately displays the topical intensity distributions PMi and PMi*, for example with different gray scale values or different colors. It can also be expedient to specially identify the overlap regions between the two corresponding intensity distributions of the groups G1 and G1* with a special coloring. As an example, the two intensity distributions or envelopes from the displays AZ1 AZ2 shifted relative to one another by $\Delta x$ are shown on the display SAZ in FIG. 1 as simultaneously overlapping, The intensity distribution PMi(x) for the group G1 is shown with dot-dash lines, and the intensity distribution PMi*(x) for the group G1* is shown with solid lines. The common overlap region is identified with hatching. The common display of the two intensity distributions or envelopes, which are to be brought optimally into coincidence insofar as possible, i.e. to maximize the overlap region, preferably ensues in real time in the display SAZ with the displacement manipulation at the control knob SK by the operator. The arithmetic unit COR continuously calculates the corresponding displacement coordinates, for example the displacement coordinate $\Delta x$ of the groups G1 and G1* relative to one another, and communicates these to a display window DP that continuously displays the displacement coordinate $\Delta x$ (and, for example, $\Delta y$ in a second displacement direction) in the upper right corner of the display SAZ. During the displacement event, the arithmetic unit COR registers the location with maximum overall area of the overlap between the two topical intensity distributions PMi(x) and PMi*(x) and retains this location of maximum relationship and displays the corresponding displacement coordinates, for example $\Delta x_{max}$, $\Delta y_{max}$, in the display window DP in the display SAZ. The location of maximum relationship can then, for example, be manually approached by the operator via the actuator HS1 or HS2.

An automatic alignment of the ribbon conductors BL1 and BL2 to one another is possible by forwarding the location coordinates $\Delta x_{max}$ and/or $\Delta y_{max}$ for the location of maximum "relationship" from the arithmetic unit COR to a control and regulation device CTU, as a signal DS6 via a line DL6. This actuates at least one of the holding devices HL1 or HL2 via allocated control lines SL1 and SL2. In FIG. 1, the control and regulation device CTU can, for example, activate the holding device HL1 via the control signal SS1. Corresponding thereto, as indicated with dot-dash lines in FIG. 1, the holding device HL2 can be operated via the control signal SS2 that is transmitted to the holding device HL2 via a control line SL2.

A completely automatic identification of the location of maximum relationship can be made in the arithmetic unit COR by calculating the respective overall correlation function, for example COR ($\Delta x$), for every displacement direction, for example the x-direction, between the overall intensity distribution PMi of the group G1 and the overall intensity distribution PMi* of the group G1*. This correlation function, for example COR ($\Delta x$), is communicated as a signal DS7 via a line DL7 to a display DSP1 and is portrayed over the respective displacement path (for example, $\Delta x$, $\Delta y$). Further details regarding this shall be set forth with reference to FIGS. 3 through 6.

The components shown in FIG. 1 can be expediently combined to form a measuring apparatus, for example, in the form of a portable measurement unit, or, for example, can also be a component of a light waveguide splicing device or of an attenuation measuring device. In addition to these especially advantageous areas of use for the invention, there is also the possibility of measuring further transmission characteristics of two groups of light waveguides residing opposite one another.

When the two ribbon conductors BL1 and BL2 are optimally aligned to one another at the location of their maximum coincidence, then the light waveguides LW1* through LW4* of the group G1* can be connected or coupled to their corresponding light waveguides LW1 through LW4 of the group G1 (for example, with the assistance of a welding device SV). To that end, the two envelopes BH1 and BH2 are brought closer to one another using one or both of the holding device HL2 or HL1, so that their axial offset in z-direction goes to zero and the end faces of the light waveguides contact one another. The light waveguide ends project a few millimeters beyond the envelopes in order to guarantee a uniform heat distribution during welding. The welding device SV can be manually or as automatically operated with the assistance of the control and regulation unit CTU. In FIG. 1, the control and regulation unit CTU activates the welding device SV with a signal SS5 via a control line SL5 indicated with dot-dash lines.

Suitable, specific control criteria for setting the welding time t can be derived in the arithmetic unit COR from the two previously identified intensity distributions PMi* and PMi for the groups G1* and G1 and can be communicated to the control and regulation unit CTU as a signal SS7 via the line SL7. Preferably, the over-coupled light power in the light waveguide pair that has the greatest, remaining radial offset in the optimum alignment condition can be utilized for identifying a specific control criterion, since an individual alignment is usually not possible in multi-fiber connecting techniques. This most poorly aligned light waveguide pair, for example, can be found by the arithmetic unit COR—in the optimum alignment condition by identifying those two corresponding, individual intensity distributions that have a minimum, individual overlap area within the overall intensity distributions PMi and PMi* shifted relative to one another. In the "snapshot" of the display SAZ of the two overall intensity distributions PMi(x) and PMi*(x) shifted by $\Delta x$ relative to one another, the two corresponding individual intensity distributions J3 and J3* have the smallest overlap area among the pairs of intensity distributions J1–J4 of the group G1 and J1*–J4* of the group G1* that are shifted relative to one another. In this alignment condition, the cores of the light waveguide pair LW3/LW3* are most poorly aligned. In order to be able to measure the coupled-over light in this light waveguide pair, the photodiode PD1 of the receiver EM1 at the reception side must be aligned to the reception field of the light waveguide LW3*. This can be automatically implemented with the assistance of the arithmetic unit COR, by transmitting a control signal SS6 via a control line SL6, indicated with dot-dash lines, to an actuator BPD for the photodiode PD1. The light coupled from the light waveguide LW3 of the group G1 into the light waveguide LW3* of the group G1* is then continuously measured with the assistance of the photodiode PD1, is converted into the electrical measured signal PM and is communicated via the line DL1 to the measured value memory MEM1. From the memory MEM1, the measured signal PM is communicated to the arithmetic unit COR as the signal DS5 via the line DL5. This reception signal can be employed as a specific control criterion for the welding time t during the welding of the two groups G1 and G1*. An optimum splice result for the most poorly aligned light waveguide pair is most critical, and thus the overall quality of the splicing process can be assured if the welding time is set using this "worst case" criterion.

Figure 2:
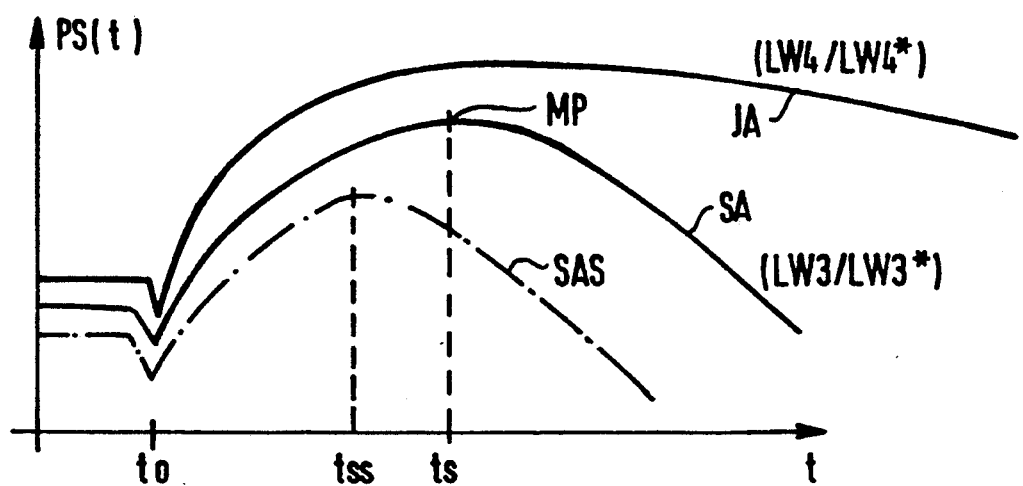
FIG. 2 is a graph showing the reception level for differently aligned light waveguide pairs during their fusing upon implementation of the method of the invention according to FIG. 1.
Figure 6:
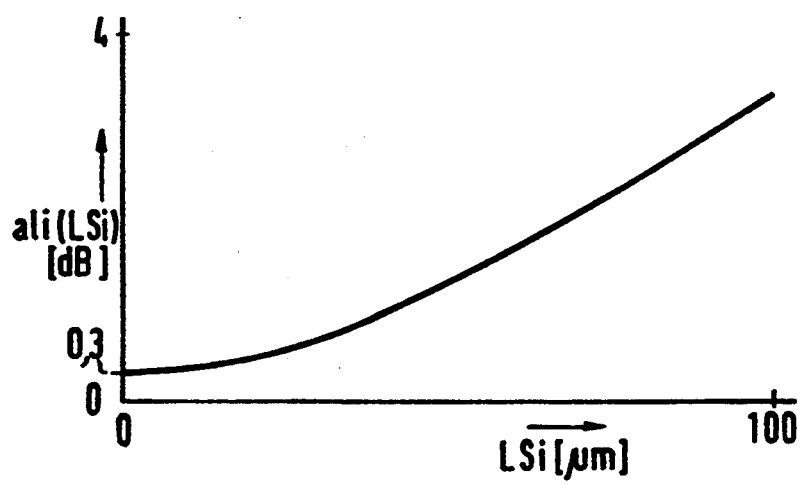
FIG. 6 shows an air gap attenuation curve dependent on the air gap length.

FIG. 2 shows respective reception levels of the light PS(t) over-coupled at the alignment location dependent on the welding time t for the light waveguide pairs LW3/LW3* and LW4/LW4*. The measured curve JA arises for a nearly ideal aligning, such as for the aligned light waveguide pair LW4/LW4*. The measured curve SA arises for a relatively poorly aligned light waveguide pair such as LW3/LW3*. A relatively flat course of the curve from the beginning of the welding process to time t0 over a relatively long welding duration arises given the nearly ideal aligning of the light waveguide pair LW4/LW4*. In the case of the relatively poorly aligned light waveguide pair LW3/LW3*, by contrast, the measured curve SA exhibits a rise of the measured level PS (t) from the welding time t0 to a time ts. After this time ts, by contrast, the reception level PS(t) again decreases, i.e. the attenuation at the alignment location or weld location again increases. An optimum time ts or (the duration after starting the welding procedure at time t0) thus exists for the poorly aligned light waveguide pair LW3/LW3*, at which time ts the welding process should be optimally stopped since a maximum MP for the reception level PS(t), i.e. a minimum attenuation, is then present. When the welding process is ended, for instance, at time ts, the remaining radial offset in the optimum alignment condition of the groups G1 and G1* for the most poorly aligned light waveguide pair LW3/LW3* will disappear as a consequence of the surface tension of the molten glass. The attenuation thereby remains substantially minimum after the end of the welding process. In this way, it is assured that the best possible welding result is obtained even for the most poorly aligned light waveguide pair LW3/LW3* in the optimum alignment condition of the two groups G1 and G1*. As a result of the relatively flat course of the measured curve JA, extremely good splice results nonetheless are achieved for all other light waveguide pairs, which are aligned better relative to one another such as, for example, LW4/LW4*, despite the premature termination of the welding process at time ts.

This method thus aborts the welding process at that time ts at which the offset for the most poorly aligned light waveguide pair LW3/LW3* approaches zero due to the surface tension of the glass. Good splice results for all other light waveguide pairs in the groups G1 and G1* are thereby simultaneously guaranteed. Inadmissibly high bendings of the cores due to the surface tension of the molten glass or other profile damages are substantially avoided due to the premature abort of the welding process at the maximum of the reception level for the most poorly aligned light waveguide pairs.

Expressed in general terms, thus, the welding time ts-t0 is shortened dependent on the quality of the core alignment of the most poorly aligned one of the participating light waveguide pairs. If, as indicated by the curve SAS in dot-dash lines, the alignment of the light waveguide combination LW3/LW3* was even worse than reproduced by the curve SA, the welding process would already have to be aborted at the time tss, i.e. the welding time ts-t0 would be selected even shorter.

As an example, FIG. 3 shows an overall intensity distribution or overall envelope PMi(x) acquired with the inventive method of FIG. 1 for the light waveguides LW1 through LW4 of the ribbon conductor BL2 for a shift motion in x-direction. The overall intensity distribution PMi(x) exhibits four individual intensity distributions or envelopes E1 through E4 for the four light waveguides LW1 through LW4. Each of these four envelopes E1 through E4 exhibits three discrete measured values such as can be acquired, for example, from the measured signals PM in FIG. 1 continuously picked up by the photodiode PD1, with the assistance of an analog-to-digital converter. The continuous overall envelope PMi(x) over the continuous location coordinates x thus has a discrete and quantized overall envelope $\widetilde{PMi}(k)$ over the discrete location coordinate k with x=k·TA (TA=scanning spacing). For example, the envelope E1 has three quantized measured intensity values DJ1, DJ2 and DJ3 defined by twice the spacing TA. The four envelopes E1 through E4 each exhibit four maxima DM1 through DM4 that respectively identify the location of maximum light power in each light waveguide LW1 through LW4 and, thus, respectively identify the center of the light waveguide core.

Corresponding to FIG. 3, a continuous overall intensity distribution or overall envelope PMi*(x) is entered as an example over the continuous location coordinate x in FIG. 4 for the light waveguides LW1* through LW4* of the ribbon conductor BL1. Corresponding to FIG. 3, this has a discrete overall intensity distribution $\widetilde{PMi}(k)$ over the discrete location coordinate k with x=k·TA. For the four light waveguides LW1* through LW4*, the intensity distribution PMi*(x)likewise has four envelopes E1* through E4* which respectively surround three discrete measured values in the scanning spacing t. For example, the envelope E1* exhibits the quantized measured values DJ1*, DJ2* and DJ3*. The envelopes E1* through E4* respectively characterize the centers of the cores of the light waveguides LW1* through LW4* by maxima DM1* through DM4*.

By comparison to the overall intensity distribution PMi*(x) from FIG. 4 with the overall intensity distribution PMi(x) from FIG. 3, it can be seen that the envelope E1* extends over the same x-coordinate section as the envelope E1, i.e. the cores of the light waveguides LW1* and LW1 are ideally aligned to one another. By contrast, the envelope E2* is shifted somewhat toward the left in comparison to the envelope E2*, i.e. the core of the light waveguide LW2* is dislocated somewhat toward the left compared to the core of the light waveguide LW2. The envelopes E3* and E4*, by contrast, are shifted somewhat toward the right by comparison to the envelopes E3 and E4, i.e. the light waveguides LW3* and LW4* are likewise unaligned with respect to the light waveguides LW3 and LW4.

FIG. 5 shows a cross-correlation function $\widetilde{COR}(n)$ over the relative, discrete displacement path n, obtained by cross-correlating the discrete overall intensity distribution $P\widetilde{M}i(k)$ of FIG. 3 with the discrete overall intensity distribution $P\widetilde{M}i^*(k)$ of FIG. 4. The cross-correlation function $\widetilde{COR}(n)$ of the discrete overall intensity distributions $P\widetilde{M}i(k)$ and $P\widetilde{M}i(k)$ is defined by $$\widetilde{COR}(n) = TA \sum_{k=1}^{N-1} P\widetilde{M}i(k) \, P\widetilde{M}i^*(k + n)$$

The discrete cross-correlation function $\widetilde{COR}(n)$ has seven maxima KM1 through KM7. The middle maximum KM4 is the greatest maximum MAX $[\widetilde{COR}(n)]=$KM4 within the discrete distribution of $\widetilde{COR}(n)$. The maximum of this discrete cross-correlated $\widetilde{COR}(n)$ identifies the discrete displacement path or location at which all four discrete individual distributions of $P\widetilde{M}i(k)$, i.e., the three samples in the envelopes E1 through E4, maximally overlap with the fourth discrete individual distributions of $P\widetilde{M}i^*(k)$, i.e., with the three respective samples in the envelopes E1* through E4*. In FIG. 5, the greatest maximum MAX $[\widetilde{COR}(n)]$ occurs at the location n=0, i.e., the optimum alignment condition and, thus, the location of maximum coincidence between the ribbon conductors BL1 and BL2, is achieved for a positional distribution of the light waveguides LW1 through LW4 relative to the light waveguides LW1* through LW4*, as shown in FIGS. 3 and 4, by the appertaining, discrete overall intensity distributions $P\widetilde{M}i(k)$ and $P\widetilde{M}i^*(k)$. It is of practical interest to approximate the discrete cross-correlation function $\widetilde{COR}(n)$ by a functional dependency (such as, for example, with the assistance of a polynomial representation or according to the sampling theorem of Shannon), since the resolution of the x-coordinate is limited by the spacing TA of the two intensity values. A continuous cross-correlation function $\widetilde{COR}(\Delta x)$ over the displacement coordinate $\Delta x$, with $\Delta X = n \cdot TA$, thus arises as the envelope for the discrete intensity measured values of the discrete cross-correlation function $\widetilde{COR}(n)$. The greatest maximum MAX $[\widetilde{COR}(\Delta X)]$ for the location coordinate $Ax=0.4$ can be exactly functionally identified (i.e., with intermediate values) from the interpolated, continuous cross-correlation function $\widetilde{COR}(\Delta x)$. In order to optimally align the two ribbon conductors BL1 and BL2 to one another, thus, the ribbon conductor BL1 is shifted toward the left by $\Delta x = 0.4$ in comparison to the ribbon conductor BL2 or the ribbon conductor BL2 is shifted toward the right by $Ax=0.4$ in comparison to the ribbon conductor BL1.

The elements shown in and discussed for FIG. 1 are provided with the same reference characters in FIG. 7. The group G1 having the light waveguides LW1 through LW4 in the holding device HL2, differing from FIG. 1, is also surrounded at its exit region AS by the outer, approximately rectangular, flat envelope BH2 of the ribbon conductor BL2. As warranted, the holding device HL2 is displaceable in three different spatial directions x, y and z. Corresponding thereto, the group G1* having the light waveguides LW1* through LW4* in the holding device HL1 is also surrounded by the outer, approximately rectangular envelope BH1 of the ribbon conductor BL1 and is potentially movable in x, y and z-direction. The longitudinal axes of the light waveguides LW1-LW4 and LW1*-LW4* are respectively indicated with dot-dash lines in the ribbon conductors BL2 and BL1. The two holding devices HL1 and HL2 are mounted on a common, stationary base plate GP for better manipulation.

The two ribbon conductors BL1 and BL2 should be as optimally aligned to one another as possible with respect to the two groups G1* and G1* of light waveguides, i.e. group-by-group, in order, in this optimum alignment condition, to be able to reliably implement, for example, an attenuation measurement or a splicing process for every light waveguide combination of the two groups. For the group-by-group identification of the optimum alignment position itself, it is not absolutely necessary to release or expose the light waveguides LW1 through LW4 from the outer envelope BH2 of the ribbon conductor BL2 or the light waveguides LW1* through LW4* from the outer envelope BH1 of the ribbon conductor BL1.

In the left part of FIG. 7, four transmission signals SP1 through SP4 are coupled into the light waveguides LW1 through LW4 of the ribbon conductor BL2 by a transmission stage SE3 for optimum position identification. To that end, the light waveguides LW1-LW4 of the ribbon conductor BL2 are placed around a cylinder ZT3 of the flexural coupler BK3 and are guided curved in the guide channel FN3 thereof, so that the transmission signals SP1 through SP4 can enter substantially tangentially into the light waveguides LW1 through LW4. The transmission signals SP1 through SP4 are respectively symbolically indicated by an arrow. The transmission stage SE3 has only a single light source LA such as, for example, a laser diode to which all light waveguides LW1 through LW4 to be measured are coupled in common as shown in FIG. 7, or has a separate light source for each light waveguide LW1 through LW4. As an alternative to the flexural coupler, the transmission signals SP1 through SP4 can be directly supplied via the open end faces of the light waveguides LW1 through LW4. As in FIG. 7, the signals SP1 through SP4 can be supplied from a separately provided test transmitter such as, for example, the light source LA, but can also be message signals in the light waveguides LW1 through LW4.

Let it be assumed for purposes of simplification for the following comments in FIG. 7 that the transmission signals SP1-SP4 coupled into the light waveguides LW1-LW4 are identical, i.e. of the same size. It will also be assumed that the same coupling factors are valid for all four light waveguide combinations LW1-LW1* through LW4/LW4* at the infeed of the transmission side and at the outfeed of the reception side.

The four test signals P2 through P4 are guided in the light waveguides LW1 through LW4 to the alignment location AS, as indicted with dot-dash lines in FIG. 7. Their respective four radiation fields SF1 through SF4 emerge from the light waveguides LW1 through LW4 at the alignment location AS.

The ribbon conductor BL2 having the light waveguides LW1 through LW4 initially resides opposite the ribbon conductor BL1 having the light waveguides LW1* through LW4* in an unaligned position. The two ribbon conductors BL1 and BL2 are now moved such relative to one another that the radiation fields SF1 through SF4 coupled out from the light waveguides LW1 through LW4 are coupled into the light waveguides LW1* through LW4* in different positions or of the two ribbon conductors BL1 and BL2 relative to one another. To this end, for example, the ribbon conductor BL1 in the holding device HL1 is shifted at least once compared to the stationary ribbon conductor BL2 in the holding device HL2, in at least one direction parallel to that plane in which the longitudinal axes of the light waveguides LW1–LW4 lie, preferably in the x-direction and/or the y-direction. As a result of this shift motion, the radiation fields SF1–SF4 coupled out from the light waveguides LW1 through LW4 are respectively acquired by the corresponding light waveguides LW1* through LW4* in different spatial positions. In FIG. 7, for example, the light waveguide LW1* thus picks up the radiation field SF1 of the test signal P1 coupled out from the light waveguide LW1 successively, i.e. continuously at different x-positions during a displacement event in the x-direction. One proceeds in exactly the same way given a displacement in y-direction or given a displacement in another spatial direction transversely, i.e. orthogonally, relative to the longitudinal axis of the ribbon conductor BL2. The reception characteristics of the light waveguides LW1* through LW4* as well as their specific light-guidance properties in their cores act on the chronological curve of the overall intensity distribution or reception level of the light of the radiation fields through SF1 through SF4 respectively coupled over from the light waveguides LW1 through LW4 into the light waveguides LW1* through LW4*. This means that the test signals coupled into the light waveguides LW1* through LW4* are then dependent both on the position or location conditions, i.e. on the characteristic outfeed conditions of the cores of the light waveguides LW1 through LW4 of the group G1, and are also simultaneously dependent on the location or position conditions, i.e. on the infeed conditions or reception characteristics, of the cores of the light waveguides LW1* through LW4* in the region of the alignment location AS.

Preferably, the displacement event of the ribbon conductor BL1 is started proceeding from a position at which a maximum for the individual intensity distribution of every light waveguide pair can still be exceeded for every light waveguide pair such as, for example, LW1/LW1*. For example, this can be achieved in a simple way by entirely withdrawing the ribbon conductor BL1 from the alignment location AS and the displacement event is started from this point. The simple relative motion of the two groups G1 and G1* of light waveguides relative to one another in the displacement direction is expediently implemented by approximately at least the maximally occurring offset of two corresponding light waveguides in the groups G1 and G1*.

It can also be expedient to only slightly shift the two ribbon conductors BL1 and BL2 relative to one another, i.e. to implement a type of jitter motion, so that portions of the radiation fields SF1–SF4 are still coupled into the light waveguides LW1* through LW4* respectively to the left and right of the individual intensity maximum (or of the maximum of the reception level), i.e. to the left and right of the principal emission direction of the radiation fields SF1 through SF4. The jitter motion for the ribbon conductor BL1 ensues, for example, in the x-direction in such a way that it is first moved a short distance $\Delta x$ in the positive x-direction and then experiences a reversal of direction by $\Delta x$ in the negative x-direction. This back-and-forth motion can be repeatedly executed. By superimposition or averaging of the test exposures, disturbing quantities such as, for example, mechanical play of the holding devices, hysteresis, as well as creep of their piezo elements can be largely eliminated. The jitter motion offers the advantage that only relatively small displacement motions of the ribbon conductor BL1 and BL2 relative to one another are required in order to be able to make statements and conclusions about their optimum alignment condition relative to one another. In the jitter motion, a displacement of two corresponding light waveguides by at least the respective radiation field width out of their ideal aligned condition is required (approximately 10 $\mu$m). As a result, information from different spatial directions can be relatively quickly acquired about the relative position of the cores of the light waveguides LW1 through LW4 in the ribbon conductor BL2 relative to the cores of the light waveguides LW1* through LW4* in the ribbon conductor BL1. In a simple way, the jitter method thus assures that the transmission maximum of respectively two corresponding light waveguides such as, for example, LW1/LW1*, can be acquired in any case.

The chronological curve of the intensity distribution of the light waveguides LW1* through LW4* is continuously picked up by a reception stage EM2. This reception stage EM2 includes a flexural coupler BK2 having a cylinder ZT2 into whose guide channel FN2 the ribbon conductor BL1 is placed. By means of at least four light-sensitive elements LE1 through LE4 that are arranged on a common base plate GU shown in part and with dot-dash lines), four reception radiation fields ES1 through ES4 that are coupled out along the curvature of the light waveguides LW1* through LW4* are acquired. The light-sensitive elements can be combined in the form of a multi-quadrant diode of a multiquadrant array or CCD array that usually comprises far more than 100 light-sensitive elements (for example, 1024×1024 elements for video standard). The light-sensitive elements LE1 through LE4 generate electrical measured signals MS1 through MS4 from the radiation fields ES1 through ES4 and supply these signals via separate measurement lines ML1 through ML4 to a measured value memory MEM2. The memory MEM2 selectively retains the chronological curve of the light coupled out from the light waveguides LW1* through LW4*.

An evaluation unit AE now searches the signals S1 (measurement sequences), continuously arriving via the line B1 from the measured value memory MEM2 for one displacement event, for that total or group intensity distribution, or that total reception level, that simultaneously exhibits the highest individual intensity maximum (or the highest reception level) for all four light waveguide combinations LW1/LW1* through LW4/LW4*. The individual intensity distributions are thus simultaneously observed for all four light waveguide pairs LW1/LW1* through LW4/LW4*. The exposure image of the group intensity distribution as well as the associated location during a displacement event are identified and registered by the evaluation unit AE which simultaneously exhibits the respectively highest, individual intensity maximums for all four corresponding light waveguide pairs LW1/LW1* through LW4/LW4* in the chronological sequence of the displacement event. The displacement motion is then stopped at that location at which the highest intensity maximum simultaneously arises for all four light waveguide pairs LW1/LW1* through LW4/LW4*. The greatest group-by-group "relationship" between the two local distributions of the cores of the light waveguides in the ribbon conductors BL1 and BL2 is present at this location.

In FIG. 7, the ribbon conductor BL1 is displaced with the holding device HL1 in the x-direction in comparison to the stationary ribbon conductor BL2. To this end, the evaluation unit AE drives the holding device HL1 via the control line SL1 by means of the control signal SS1 (corresponding to the control lines in FIG. 1).

Further combinations of relative motions between the two ribbon conductors BL1 and BL2 can be implemented, analogously to FIG. 1. The holding device HL2 can be actuated by means of the control signal SS2 via the control line SL2, shown with dot-dash lines. The evaluation unit AE finally seeks out the measured exposure having the four simultaneously highest individual intensity maxima. By means a signal S3 via a line B3, it commands the measured value memory MEM2 to visual display this overall intensity distribution PiVER with $i=1$ through 4 on a display DSP2, such as a graphics display screen, as a signal S2 via a line B2.

The optimally obtainable reception conditions (optimum alignment condition) for the overall intensity distribution PiVER, with $i=1$ through 4, i.e. maximum signal level for all four light waveguide combinations LW1/LW1* through LW4/LW4* are simultaneously registered in the display DSP2 in FIG. 7. Four envelopes P1VER through P4VER are allocated to the four light waveguide pairs LW1/LW1* through LW4/LW4* as individual intensity distributions. These envelopes P1VER through P4VER exhibit four maxima M1VER through M4VER that all lie in a tolerance range P between an upper limit OS and a lower limit US. (Given displacement motion in the x-direction with simultaneous definition of a lower limit US and an upper limit OS, optimal alignment in the y-direction for all fiber pairs is ideally assumed for simplification.) The maxima M1VER through M4VER respectively represent the locations of maximum light guidance, i.e. the centers of the cores of the light waveguide pairs to be measured that are aligned to one another. The lower limit US marks that intensity value that is minimally required for what is still an allowable aligned position of one of the light waveguide pairs. The upper limit OS, by contrast, characterizes that intensity value that can be maximally achieved for an ideally aligning light waveguide pair.

Within the overall intensity distribution PiVER, with $i=1$ through 4, for the group-by-group, optimum aligned condition, the light waveguide combination LW1/LW1* exhibits the envelope P1VER having the greatest maximum M1VER ($>$MiVER, with $i=2, 3, 4$) just below the upper limit OS. It proceeds therefrom that the light waveguide LW1 is nearly ideally aligned, i.e. in alignment with the light waveguide LW1*. The light waveguide combination LW2/LW2*, by contrast, represents the most poorly aligned light waveguide pair, since its appertaining envelope P2VER has its maximum value M2VER lying just slightly above the lower permissible limit US. Further details regarding the evaluation of the overall intensity distribution are described in FIGS. 8 through 10.

Attenuation measurements for the four light waveguide pairs allocated to one another can be implemented at the location of optimum coincidence between the two groups G1 and G1* of light waveguides. The light waveguides LW1/LW4 can be connected in pairs to the light waveguides LW1*-LW4* with the assistance of a welding device SV2 indicated with dot-dash lines. For the welding process, the light waveguide combinations LW1/LW1*-LW4/LW4* are stripped (corresponding to FIG. 1) of their outer envelopes BH2* through BH1 in advance, i.e. before the alignment and welding process. The welding device SV2 is operated proceeding from the evaluation unit AE with a control signal SS8 via a line SL8 indicated with dot-dash lines. The control of the welding process can ensue in the way already set forth for in FIGS. 1 and 2.

Whereas the method of the invention presented in FIG. 1 first supplies the actual, topical intensity distributions of the light waveguides in the two ribbon conductors to be aligned to one another and a yardstick for the "degree of relationship" between the core position of the light waveguide combinations, i.e. their optimum position, is identified therefrom only thereafter, the optimum alignment condition can be identified in a direct way with the inventive method of FIG. 7. This is because light is coupled into the light waveguides to be measured in the one group, is coupled over into the corresponding light waveguides of the other group at the alignment location, and the infeed light in this other group is actually measured; the optimum, relative position of the two groups relative to one another can be directly identified with high precision and high speed.

The measuring instruments of the invention according to FIGS. 1 and 7 can be a component of an attenuation measuring apparatus or of a splicing apparatus for multifiber technique. Their components can be combined to form a portable measuring unit.

In FIGS. 8 through 10, the inventive method of FIG. 7, for example, is implemented for identifying optical transmission characteristics such as, for example, the splice attenuation when joining two groups of light waveguides, particularly when welding two ribbon conductors. Elements which are the same as described in FIG. 7 are provided with the same reference characters in FIGS. 8 through 10.

The two ribbon conductors BL1 and BL2 of FIG. 7 are shown in an enlarged plan view in FIGS. 8 through 10. In order to be able to optimally weld the two ribbon conductors BL1 and BL2 to one another, these conductors are first optimally aligned to one another with the assistance of the inventive method of FIG. 7 and the measuring instrument of the invention shown therein. The light waveguides LW1 through LW4, firmly embedded in the outer envelope BH2, of the ribbon conductor BL2 are thus optimally aligned overall as a group G1 in the alignment region AS to the group G1* having the light waveguides LW1* through LW4* that are firmly embedded in the outer envelope BH1 of the ribbon conductor BL1. For the alignment event, the light waveguides LW1 through LW4 of the ribbon conductor BL2 respectively reside opposite the light waveguides LW1* through LW4* of the ribbon conductor BL1 with a spacing LS1 through LS4 between 0 mm and 1 mm with respect to their light waveguide ends in the region of the alignment location AS. For the welding process, the light waveguides LW1 through LW4 and LW1* through LW4* are removed from their respective outer envelopes BH2 and BH1 and, if necessary, their coating is removed in order to minimize contaminations due to their envelope material at the splice location during the welding process and thus degradation of the connection quality. The light waveguides LW1 through LW4 and LW1* through LW4* are exposed in the region of the alignment location AS over a relatively short length, particularly between 3 mm and 10 mm. In this case, the light waveguides LW1 through LW4 and LW1* through LW4* can be advantageously placed into guide means, as shown by example in FIG. 1, for securing the positions. In FIGS. 8 through 10, the position of the light waveguide cores, i.e. the location of maximum light guidance of the light waveguides LW1 through LW4 and LW1* through LW4* is indicated with dot-dash lines. In order to be able to measure the degree of relationship between the topical distributions of the groups G1 and G1* during the alignment and welding process, test signals P1 through P7 according to FIG. 7 are supplied into the light waveguides LW1 through LW4 of FIGS. 8 through 10. Their radiation fields respectively emerge at the open ends of the light waveguides LW1 through LW4 in the region of the alignment location AS and are at least partially coupled into the open ends of the light waveguides LW1* through LW4* of the group G1*. The chronological curve of the light coupled into the light waveguides LW1* through LW4* is registered according to FIG. 7 via measured signals MS1 through MS4 and is continuously displayed on the display DSP2 of FIG. 7. The intensity distributions required for the identification of the splice attenuation are schematically shown on the display DSP2 in FIGS. 8 through 10. The intensity distribution reproduces the distribution of the over-coupled power that in turn represents the coupling efficiencies in the infeed of the transmission side and in the outfeed of light at the reception side. For example, the following independent measuring steps are implemented for identifying the splice attenuation in the x-direction (the splice attenuation in y-direction can be identified in an analogous way). It is assumed below for reasons of simplification, however, that all corresponding fiber pairs are already optimally aligned in the y-direction, so that, for example, only an alignment with respect to the x-direction still has to be implemented and discussed.

In a first measuring step, the ribbon conductor BL1 is moved back and forth relative to the ribbon conductor BL2 at least once in the x-direction (corresponding to the coordinate system of FIG. 7). In FIG. 8, this back and forth motion (jitter) is indicated by a double arrow VR that points in the positive and negative x-directions. The ribbon conductors BL1 and BL2 initially residing opposite one another in an unaligned initial position are respectively shifted back and forth along at least one displacement path such that an absolute intensity maxima M1lD through M4lD in the resulting, best-possible chronological intensity curve PilD, with i=1 through 4, of the light supplied into the light waveguides LW1* through LW4* can be individually measured for each of the corresponding light waveguide pairs LW1/LW1* through LW4/LW4* that are to be connected. The displacement path is composed of the greatest occurring offset of the most poorly aligned light waveguide cores such as, for example, LW2/LW2* in FIG. 8, as well as of the respective width of the radiation field (approximately 10 $\mu$m given monomode light waveguides) in the originally unaligned, initial condition of the ribbon conductors BL1/BL2. When, for example, a type of jitter corresponding to FIG. 7 is executed between the two ribbon conductors BL1 and BL2, it is possible to respectively exceed the absolute intensity maxima M1lD through M4lD for every corresponding light waveguide pair, and thus to individually obtain a topically resolved, or chronologically resolved, maximally possible (best possible) intensity distribution P1lD through P4lD (or distribution of the coupled power) for every corresponding light waveguide pair. (Given a constant relative speed, the displacement location corresponds to the displacement time.)

The individual intensity distributions (or individual power distributions) E1lD through E4lD are allocated as envelopes to the light waveguide combinations LW1/LW1* through LW4/LW4*. Their maxima M1lD through M4lD indicate the best possible coupling efficiencies (or intensity distributions P1lD through P4lD) occurring in the chronological curve, and thus identify the individual alignment of two light waveguides allocated to one another. The snapshot imaged in the display DSP2 shows that the absolute intensity maximum M1lD for the light waveguide pair LW1/LW1* is present in the chronological intensity curve E1lD (=P1lD) and thus indicates that this light waveguide combination LW1/LW1* is aligned, i.e., reside opposite one another without offset in the x-direction. The light waveguide pairs LW2/LW2*, LW3/LW3* or LW4/LW4*, by contrast, are unaligned in the x-direction in the snapshot of FIG. 8 (E2lD≠P2lD, E3lD≠P3lD, E4lD≠P4lD). The pair LW3/LW3* is approximately aligned like the pair LW1/LW1*, so that their maxima are therefore exceeded at approximately the same time given the displacement motion in the x-direction.

The maxima of M2lD through M4lD are likewise individually passed in succession, i.e., in chronological succession during the jitter motion. The maxima M1lD through M4lD and/or their associated best possible power distributions P1lD through P4lD are stored in the evaluation unit AE of FIG. 7.

While the two ribbon conductors BL1 and BL2 are being displaced back and forth relative to one another, an optimum alignment condition also arises when the resulting individual power levels are simultaneously highest for all corresponding light waveguide pairs LW1/LW1* through LW4/LW4*. This is then the location of the greatest relationship between the two groups of light waveguides. This optimum alignment condition is shown in FIG. 9 in the display DSP2.

All individual intensity distributions PiVER, with i=1 . . . 4, like within a tolerance range T between a lower limit US and an upper limit OS. The upper limit OS identifies the maximally obtainable power level that can be achieved for an individual alignment of corresponding light waveguide pairs without offset in the x-direction. The lower limit US, by contrast, identifies that power level that is just still acceptable for a spliced connection with offset.

By norming the intensity distributions P1VER through P4VER with their best possible intensity distributions, i.e. intensity distributions P1lD through P4lD that can be achieved with out offset, i.e.

$$\frac{PiVER}{PilD} \text{ with } i = 1 \text{ through } 4,$$

the upper limit OS is set to "one" (OS=1). A value below 1 (US<1) then results for the lower limit US. When a difference of 3 dB is selected between upper limit OS (=1) and lower limit US (<1) for the tolerance range T, then US=0.5 results for the lower limit. This means that for the optimum alignment condition for all normed power levels is $$US = 0.5 < \frac{PiVER}{PiID} < 1 = OS, \text{ with } i = 1 \text{ through } 4.$$

In logarithmic representation, the following relationship holds:

$$o \text{ dB} < \left| 10 \log \frac{PiVER}{PiID} \right| < 3 \text{ dB}.$$

Of course, a norming of the intensity distributions PiVER, with i=1 through 4, to the absolute maximums MiID, with i=1 through 4 of the best possible, obtainable intensity distributions PiID, with i=1 through 4, is equally possible, i.e.

$$\frac{PiVER}{MiID} \text{ with } i = 1 \text{ through } 4.$$

The norming offers the advantage that the evaluation becomes independent of the aligned condition in y-direction as well as independent of external influencing factors such as, for example, the different coupling efficiencies at the infeed of the transmission side and the outfeed of light at the reception side such as can be produced, for example, by different color applications (different colors, different layer thicknesses, etc.) on the light waveguides in the ribbon conductors. In practice, differences in the coupling efficiency up to 30 dB can occur for the individual light waveguides, as a result of which an objective evaluation would become extremely uncertain. Due to the norming, it is similarly no longer of any significance whether transmission signals, test signals and/or reception signals of equal size or different sizes are present for the individual light waveguides.

Given normed entry of the light powers or intensities (and assuming of an optimum alignment has already been carried out in the y-direction, for reasons of simplification), the light waveguide pair LW1/LW1*, for example, is aligned in the x-direction approximately without offset, i.e. ideal aligning in the snapshot of FIG. 9. The light waveguide pairs LW2/LW2* through LW4/LW4*, by contrast, have a remaining but still tolerable offset, whereby the light waveguide combination LW2/LW2* has the lowest reception level P2VER, and thus the greatest remaining offset. In this optimum aligned condition for all light waveguides of the two groups G1 and G1* relative to one another, the relative maxima MiVER, with i=1 through 4, of the individual intensity distributions PiVER, with i=1 through 4, of two corresponding light waveguides are retained in the evaluation unit AE. Finally, the two ribbon conductors BL1 and BL2 are moved toward one another in this aligned condition and the welding process is carried out as described in connection with FIGS. 1 and 7. The welding process can be controlled by the maximally remaining offset of the most poorly aligned light waveguide pair. In FIG. 9, this is the offset of the light waveguide pair LW2/LW2* that has the greatest attenuation in the display DSP2, i.e. the lowest individual intensity distribution P2VER. When the lower limit US is now downwardly exceeded by a power level, the welding process is aborted and a new alignment procedure is started.

After implementation of the multiple splice for the two groups G1 and G1*, the intensity distributions PiS with i=1 through 4, with their local maxima MiS, with i=1 through 4, of the corresponding light waveguide pairs are measured again and are retained in the evaluation unit AE of FIG. 7. An overall intensity distribution PiS after the implementation of the welding process is recorded in the display DSP2 as an example in FIG. 10. Given welding in the optimum aligned condition of FIG. 9, the remaining offsets of the two groups of light waveguides disappear due to the surface tension of the molten glass. Even for poorly aligned light waveguide pairs such as, for example, for LW2/LW2* as described in connection with FIG. 2, the attenuation can be advantageously reduced. All power levels PiS, with i=1 through 4, in FIG. 10 exhibit a slight improvement when compared to the snapshot of FIG. 9.

The actual, individual splice attenuation in the x-direction can be individually calculated for every corresponding light waveguide pair LW1/LW1* through LW4/LW4* with these three measuring steps. This, for example, can be implemented with the evaluation unit AE of FIG. 7. The actual, individual splice attenuation for every light waveguide pair is essentially additively composed of three parts, as follows:

In multi-fiber technology, a radial offset for a light waveguide pair remains in the optimum aligned condition of two groups G1 and G1* of light waveguides since an individual alignment is usually not possible. An increased attenuation arises as a consequence of the deviation from the best possible (ideal), individual aligned condition. The relationship of the best possible power level PiID, with i=1 ... 4, in the ideal aligned conditions to the power levels PiVER, with i=1 ... 4, in the optimum aligned condition describes the attenuation $\Delta avi$ produced by the remaining offset of the two groups G1 and G1*:

$$\Delta avi = 10 \log \frac{PiID}{PiVER} \quad \text{(Equation 1)}$$

with i=1 through 4.

The attenuation due to the remaining offset in x-direction is:

$$\Delta avi(x) = 10 \log \frac{PiID(x)}{PiVER(x)}$$

with i=1 through 4

The corresponding maxima can also be placed in relationship for simplicity:

$$\Delta avi = 10 \log \frac{MiID}{MiVER}$$

with i=1 through 4.

The areas under the corresponding intensity distributions can also be expediently placed into relationship.

That attenuation $\Delta asi$, with i=1 ... 4, which is caused by the welding of two corresponding light waveguides is calculated for each pair from the relationship of the power levels PiVER in the optimum aligned condition to the power levels PiS, with i=1 ... 4, after the welding of the corresponding light waveguides:

$$\Delta asi = 10 \log \frac{PiVER}{PiS} \quad \text{(Equation 2)}$$

with i=1 through 4.

The change in attenuation in the x-direction due to the welding process is:

$$\Delta asi(x) = 10 \log \frac{PiVER(x)}{PiS}$$

with i=1 through 4.

Corresponding to Equation 1, the maxima of or the areas under the power level curves can also be placed into relationship as follows:

$$\Delta asi = 10 \log \frac{MiVER}{MiS}$$

with i=1 through 4.

Finally, that attenuation part $\Delta ali$, with i=1 through 4, which is produced by different, individual air gap lengths LS1 through LS4 (see FIG. 8) between two corresponding light waveguides can be approximately taken into consideration with the following correction formula. In a good approximation, the air gap attenuation $\Delta ali$ is defined as the sum of an "ideal" attenuation and a correction factor.

$\Delta a1$ is the air gap attenuation given an ideally aligned light waveguide pair (and, therefore, independently of i). $\Delta a1$ amounts to approximately 0.3 dB due to reflections at the transition of glass-to-air, or air-to-glass (diffractions). Given large air gap lengths, an additive correction $\Delta azi$ can become necessary (corresponding to the air gap length LSi, with i=1 through 4, of the $i^{th}$ fiber pair in the z-direction). The total air gap attenuation $\Delta li$ is then as follows:

$$\Delta azi = -10 \log \frac{1}{1 + \frac{Lsi^2}{2a}}$$

with i=1 through 4 and LSi in $\mu m$.

The factor a can be empirically identified for monomode light waveguides, whereby a is a function of the field diameter and of the wavelength. For conventional monomode fibers a 50 $\mu m$ for 1300 nm (wavelength). The air gap attenuation $\Delta ali$ is entered in FIG. 6 dependent on the air gap length LSi, with i=1 through 4. When the air gap length LSi approaches zero (LSi=0), then approximately 0.3 dB losses remain due to reflections at the transition glass-to-air or air-to-glass in the transition regions between two light waveguides aligned ideally. When the air gap lengths LSi increases (LSi>0), then losses due to diffraction effects are added thereto. These can be separately taken into consideration by the additive correction formula for each light waveguide pair LW1/LW1* through LW4/LW4*.

The overall splice attenuation $\Delta ai$, with i=1 through 4, thus is selectively and individually derived for every light waveguide pair LW1/LW1* through LW4/LW4* to be connected. This is derived additively from the three sub-attenuations $\Delta ali$, $\Delta avi$ and $\Delta asi$:

$$\Delta ai = \Delta ali + \Delta avi + \Delta asi \qquad (4)$$

with i=1 ... 4.

Only the case of an alignment of the ribbon conductors BL1 and BL2 in the x-direction is treated in FIGS. 8 through 10. A corresponding alignment of the ribbon conductors BL1 and BL2 to one another, of course, can also be additionally implemented before the welding process in an arbitrary direction transversely relative to the longitudinal axis of the two ribbon conductors BL1 and BL2. Thus, the individual, selective attenuation $\Delta avi(x)$ due to an offset in the x-direction and $\Delta avi(y)$ due to a remaining offset in y-direction can, for example, be respectively identified for any two corresponding light waveguide pairs to be welded to one another.

Resolved, equation 4 then reads:

$$\Delta ai = \Delta ali + \Delta avi(x) + \Delta avi(y) + \Delta asi$$

with $\Delta avi = \Delta avi(x) + \Delta avi(y)$ due to the offset in x-direction and y-direction.

Although only the splice attenuation was presented in FIGS. 8 through 10, the methods and procedures presented therein as well as their advantages are also valid in the identification of other optical transmission characteristics such as, for example, phase running times, transmission behavior, pulse responses, etc. The advantages shown in FIGS. 8 through 10 can also be achieved even without the above-described methods for identifying the position of the light waveguides in the two groups.

The exemplary embodiments shown in FIGS. through 10 and the descriptions thereof refer to a specific number (n=4) of light waveguides for the purpose of greater clarity, however, they can be employed without limitation to an arbitrary number of light waveguides.

Although modifications and changes may be suggested by those skilled in the art, it is the intention of the inventor to embody within the patent warranted hereon all changes and modifications as reasonably and properly come within the scope of his contribution to the art.

I claim as my Invention:

1. A method, for use with light waveguides respectively arranged extending along respective longitudinal axes in a first group and in a second group, to identify the position of the light waveguides in at least one of said groups, said method comprising the steps of:
    (a) coupling infeed light into at least one waveguide in one of said groups;
    (b) generating at least one displacement event of one of said groups relative to the other of said groups, to said longitudinal axis of one of said groups in at least one plane;
    (c) coupling light between said at least one waveguide having infed light in one of said groups and at least one waveguide associated with the other of said groups during said displacement event;
    (d) identifying a chronological intensity distribution of said infeed light of each waveguide having infed light coupled in step (c);
    (e) identifying a spatial intensity distribution of said light coupled into said at least one waveguide associated with said other of said groups as a result of said chronological intensity distribution; and
    (f) retaining said spatial intensity distribution for evaluating the position of said waveguides in said other of said groups.

2. A method as claimed in claim 1 wherein step (f) is further defined by identifying an optimally aligned condition of said light waveguides in said first and second groups when said spatial intensity distribution for said first group has a greatest overlap with said spatial intensity distribution for said second group.

3. A method as claimed in claim 2 wherein each waveguide in said first group has an intensity distribution contributing to said spatial intensity distribution of said first group and wherein each waveguide in said second group has an intensity distribution contributing to said spatial intensity distribution of said second group, and wherein the step of identifying an optimal alignment of said waveguides in said first and second groups is further defined by individually measuring, and comparing the respective intensity distributions of a light waveguide in said first group with the light waveguide in said second group with which it is to be aligned.

4. A method as claimed in claim 2 comprising the additional step of:
after said light waveguides in said first and second groups are aligned, splicing said light waveguides in said first and second groups together.

5. A method as claimed in claim 4 wherein the step of splicing said light waveguides in said first and second groups together is further defined by splicing said light waveguides in said first and second groups together by welding said light waveguides.

6. A method as claimed in claim 4 comprising the additional step of:
controlling said splicing based on the chronological intensity distribution of step (d).

7. A method as claimed in claim 6 wherein step (f) is further defined by selecting the two most poorly aligned waveguides of said first and second groups and controlling splicing based on the chronological intensity distribution of said most poorly aligned waveguides during said splicing.

8. A method as claimed in claim 6 wherein steps (d), (e) and (f) are repeated after said splicing.

9. A method as claimed in claim 1 wherein said light waveguides in said first group are to be aligned with said light waveguides in said second groups, with each light waveguide in said first group and the light waveguide in said second group with which it is to be aligned being defined as corresponding light waveguides, and wherein step (f) is further defined by successively evaluating the position of each pair of corresponding waveguides in said first and second groups.

10. A method as claimed in claim 1 wherein step (f) is further defined by individually displaying said spatial intensity distribution for each of said waveguides in said first and second groups, and comparing the displayed spatial intensity distributions for aligning said waveguides in said first and second groups.

11. A method as claimed in claim 1 further defined by conducting steps (a), (b), (c), (d), (e) and (f) in a first sequence to obtain a spatial intensity distribution for said waveguides in said first group, and conducting steps (a), (b), (c), (d), (e) and (f) in a second sequence for obtaining a spatial intensity distribution of said waveguides in said second group, and comprising the additional step of comparing said spatial intensity distribution of said waveguides in said first group with said spatial intensity distribution of said waveguides in said second group for obtaining an optimum alignment of said waveguides in said first group with said waveguides in said second group.

12. A method as claimed in claim 1 wherein step (b) is further defined by displacing one of said groups at least once in a direction parallel to a plane containing the axes of the light waveguides of one of said groups.

13. A method as claimed in claim 12 wherein step (b) is further defined by additionally displacing said one of said groups at least once in a direction perpendicular to said direction parallel to said plane, and wherein steps (d), (e) and (f) are implemented for each of said directions.

14. A method as claimed in claim 1 wherein step (c) is further defined by continuously coupling light between said at least one waveguide in said one of said groups and at least one waveguide in the other of said groups during said displacement event.

15. A method as claimed in claim 1 wherein step (c) is further defined by continuously coupling light between said at least one waveguide in said one of said groups and at least one waveguide separately provided in addition to the other of said groups during said displacement event, and wherein step (e) is further defined by identifying a spatial intensity distribution of said light coupled into said at least one waveguide provided in addition to said other of said groups as a result of said chronological intensity distribution.

16. A method as claimed in claim 1 comprising the additional step of placing at least one of said light waveguides in a guide element.

17. A method as claimed in claim 1 wherein step (e) is further defined by directly acquiring said spatial intensity distribution of said light coupled into said at least one waveguide associated with said other of said groups from said chronological intensity distribution.

18. A method as claimed in claim 1 wherein step (b) is further defined by generating a back-and-forth displacement of said first and second groups, in a displacement event, transversely to said longitudinal axis of one of said groups in at least one plane.

19. A method as claimed in claim 1 wherein said light waveguides in said first and second groups are to be aligned, with a light waveguide in said first group and a light waveguide in said second group with which it is to be aligned being defined as corresponding waveguides, and wherein said first and second groups are initially disposed with two corresponding waveguides in said first and second groups exhibiting a maximum offset, and wherein step (b) is further defined by generating a relative displacement of said first and second groups by a displacement distance corresponding to said maximum offset.

20. A method as claimed in claim 1 wherein step (f) is further defined by identifying an optimally aligned position of said first and second groups relative to each other from said chronological curve of the intensity distribution.

21. A method as claimed in claim 1 wherein step (f) is further defined by evaluating said position of said light waveguides in said other of said groups to identify a lateral offset between a selected light waveguide in one of said groups and a selected light waveguide in the other of said groups.

22. An apparatus, for use with light waveguides respectively arranged extending along respective longitudinal axes in a first group and in a second group, to identify the position of the light waveguides and at least one of said groups, said apparatus comprising:
first holder means for holding said first group of waveguides;
second holder means for holding said second group of waveguides relative to said first group;
means for coupling infeed light into at least one waveguide in one of said groups;
means for relatively displacing said first and second holder means for generating a relative displacement of said first and second groups, in at least one displacement event, in a plane extending transversely to said longitudinal axis of one of said groups, with light being coupled during said displacement event between said at least one waveguide having infed light in said one of said groups and at least one waveguide associated with the other of said groups;

means for identifying a chronological curve of the intensity distribution of said coupled light;

means for identifying a spatial intensity distribution of said light coupled into said at least one waveguide associated with said other of said groups as a result of said chronological intensity distribution; and means for retaining said spatial intensity distribution for evaluating the position of said waveguides in said other of said groups.

23. An apparatus as claimed in claim 22 wherein said means for displacing said first and second holder means comprises means for successively displacing said first and second holder means in successive first and second displacement events, wherein said means for coupling infeed light into at least one waveguide in one of said groups comprises means for coupling infeed light into at least one waveguide in said first group during said first displacement event and for coupling infeed light into at least one waveguide in said second group during said second displacement event, wherein said means for identifying a chronological curve of the intensity distribution of said coupled light comprises means for identifying a first chronological curve of a first intensity distribution of said coupled light during said first displacement event and for identifying a second chronological curve of a second intensity distribution of said coupled light during said second displacement event, wherein said means for identifying a spatial intensity distribution comprises means for identifying a first spatial intensity distribution as a result of said first chronological intensity distribution during said first displacement event and for identifying a second spatial intensity distribution of said second chronological intensity distribution during said second displacement event, and wherein said means for retaining said spatial intensity distribution comprises means for retaining said first and second spatial intensity distributions for evaluating the position of said waveguides in both of said first and second groups.

24. An apparatus as claimed in claim 23 further comprising means for identifying an optimum aligned position of said waveguides in said first and second groups from said first and second spatial intensity distributions.

25. An apparatus as claimed in claim 24 wherein said means for identifying an optimum aligned position comprises:

first display means for visually displaying said first spatial intensity distribution; and second display means for visually displaying said second spatial, intensity distribution.

26. An apparatus as claimed in claim 24 wherein said means for identifying an optimum aligned position comprises display means for displaying a cross-correlation of said first and second spatial intensity distributions.

27. An apparatus as claimed in claim 23 further comprising means for splicing said waveguides in said first and second groups together after said waveguides in said first and second groups are aligned.

28. An apparatus as claimed in claim 22 further comprising control means for automatically controlling the operation of said means for displacing said first and second holder means.

29. An apparatus as claimed in claim 22 wherein said means for identifying a spatial intensity distribution of said light coupled into said at least one waveguide associated with the other of said groups as a result of said chronological intensity distribution comprises at least one light-sensitive element.

30. An apparatus as claimed in claim 22 wherein said means for coupling infeed light into at least one waveguide in one of said groups comprises transmission means for selectively coupling infeed light into at least one waveguide in one of said groups.

* * * * *